United States Patent

[11] 3,547,204

[72] Inventor Era E. Urban
R.R. 1, Blufton, Ohio 45817
[21] Appl. No. 773,169
[22] Filed Nov. 4, 1968
[45] Patented Dec. 15, 1970

[54] MULCHING ATTACHMENT
9 Claims, 8 Drawing Figs.
[52] U.S. Cl. .................................................. 172/538,
172/554
[51] Int. Cl. ....................................................... A01b 21/02
[50] Field of Search ........................................ 172/554,
538, 519, 518, 540, 96, 173, 21; 47/9; 111/6.85;
152/209

[56] References Cited
UNITED STATES PATENTS
463,229    11/1891    Hiestand ...................... 172/540X
1,780,587  11/1930    Gustafson ..................... 172/519
2,249,638   7/1941    Rietz ............................ 172/519
2,741,968   4/1956    Harris ........................... 172/554
3,207,234   9/1965    Stewart ........................ 172/519

Primary Examiner—Robert E. Pulfrey
Assistant Examiner—Stephen C. Pellegrino
Attorney—Larson, Taylor and Hinds ABSTRACT: A mulching attachment for a press wheel of a planter or the like is adapted to be mounted between the beveled rims of the wheel. The attachment includes a series of mulching teeth which work the soil as the press wheel passes thereover and thus prevent crusting over or other hardening of the soil.

PATENTED DEC 15 1970

3,547,204

INVENTOR
ERA E. URBAN

BY Larson and Taylor

ATTORNEYS

MULCHING ATTACHMENT

FIELD OF THE INVENTION

The present invention relates to press wheels for planters and the like and more particularly to a mulching attachment for preparing the soil during planting.

BACKGROUND OF THE INVENTION AND THE PRIOR ART

Generally, before seeding, soil is prepared through the use of a suitable tool such as a disc, harrow, cultipacker or the like or combinations thereof. The soil is "worked" to a depth of 3 or 4 inches and is reduced to as fine particles as is feasible in order to provide aeration and to generally improve the cultivating properties thereof. Although it is generally desirable that the soil be relatively loosely packed there should be some compaction of the soil around the seed itself. It is a primary function of a press wheel to provide such compaction.

A popular form of press wheel comprises first and second beveled rims mounted for rotation on a central hub. In a later variation on this type of press wheel a resilient tire is mounted between the beveled rims and the outer peripheral surfaces thereof are adapted to flex inwardly and flatten against the beveled rims during rotation of the wheel as these surfaces contact the ground. The flattened outer surfaces of the tire will return to the normal positions thereof after passing over and contacting the ground and the flexing of these surfaces serves to dislodge whatever soil tends to adhere to the tire. In a relatively recent variation on this latter development a series of projecting members or "fracture bars" are provided on the outer surfaces of the tire. The purpose of these bars is to provide indentations in the soil so as to combat crusting over of the soil.

Crusting over of the soil is a particular problem with a press wheel employing a tire mounted between the beveled rims in that the entire region over which the tire passes is pressed down thereby. Thus, viewed in cross section, a soil surface in the form of a recessed compact oval is produced by such an arrangement, the recessing being a result of the beveled rims of the press wheel and the compact oval shape being a result of the inward flexing of the tire. Such a surface will tend to harden rapidly to form a crust depending, of course, on the sun and moisture conditions of the area. It will be appreciated that rain will run off freely from such a surface and that the emergence and free growth of the plants from the seeds will be impeded by such hardening of the soil. Although the provision of fracture bars on the surfaces of the tire as described hereinabove may tend to lessen severity of the hardening the basic problem still remains. To explain, it should be noted that the surface produced by such an arrangement will again be generally oval and the indentations formed by the projecting bars will slope downwardly along the sides of the oval. Such a surface will not retain significant amounts of rain water (the downwardly sloping indentations holding very small amounts) and thus the problem of rain water running freely off of the surface so produced and the consequent hardening thereof due to the inability of the soil surface to retain water remains.

SUMMARY OF THE INVENTION

In accordance with the invention an attachment for a press wheel is provided wherein mulching of the upper surfaces of the soil over which the press wheel passes is effected so that the soil can better retain moisture and thus hardening thereof is combatted. The term "mulching" is used here to mean treating the soil such that the surface thereof is left comparatively soft, mellow, loose, friable and in an unpacked condition.

In accordance with a presently preferred embodiment of the invention the mulching attachment comprises a semiflexible band of a material such a steel which is formed as an annulus and which is adapted to be mounted between the beveled rim portions of a press wheel. The mulching attachment includes a series of mulching projections or teeth which project outwardly of the outer peripheral surface of the band-formed annulus.

In accordance with an alternate preferred embodiment the mulching teeth are formed by separate elements embedded in or as integral elements molded in a resilient carrier annulus. The carrier annulus is mounted in a supporting annulus in spaced relationship to a base portion thereof to provide flexibility. The carrier annulus is bonded to beveled side portions of the supporting annulus which, in addition to providing support, also engage the beveled rim portions of the press wheel to provide a flush fitting between the mulching attachment and the press wheel.

Other features and advantages of the invention will be set forth in or apparent from the detailed description of the preferred embodiments found hereinbelow.

DESCRIPTION OF THE PREFERRED EMBODIMENTS

Figure 1:
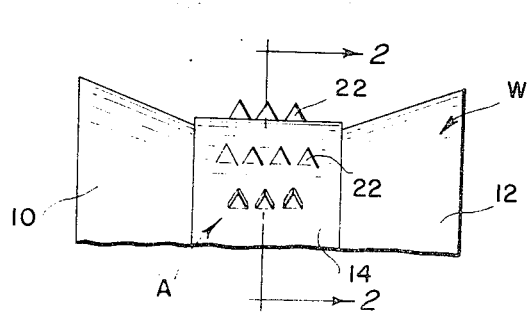
FIG. 1 is a fragmentary front elevational view of a presently preferred embodiment of the invention as incorporated into a conventional press wheel.
Figure 8:
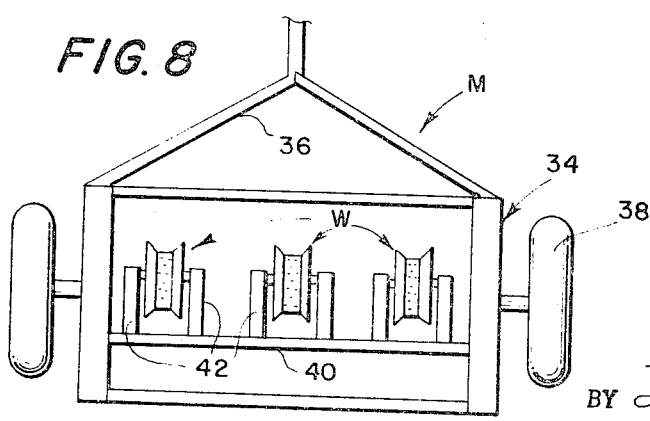
FIG. 8 is a top view of a planting machine including a series of press wheels incorporating the mulching attachment of the invention.

Referring to FIG. 1, a mulching attachment generally denoted A is shown mounted on a press wheel denoted W. The press wheel W includes first and second spaced apart beveled rim portions 10 and 12 which may be joined by a series of spoke members (not shown in FIG. 1 but denoted S in FIG. 4) to a central hub (not shown). A top view of the complete press wheel is shown in FIG. 8. The details of construction of the press wheel form no part of the present invention and because of the well-known nature thereof further description of the press wheel itself is deemed unnecessary.

Figure 2:
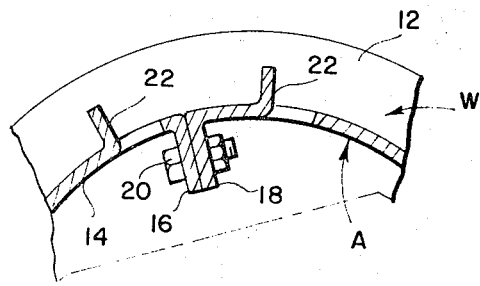
FIG. 2 is a sectional view taken generally along line 2–2 of FIG. 1.
Figure 3:
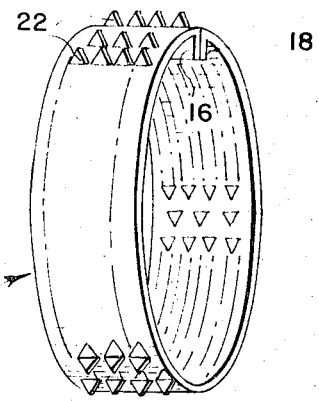
FIG. 3 is a perspective view of the mulching attachment of FIGS. 1 and 2.

The construction mulching attachment A can best be appreciated by considering FIGS. 1, 2 and 3 together. The attachment A is formed from a single band or rim 14, constructed of a suitable material such as steel, into a ring or annulus (see FIG. 3). Downwardly depending flanges 16 and 18 located on opposite ends of band 14 are bolted together by suitable means such as bolt 20 to form the completed cylinder and to mount the attachment onto the press wheel W. Mulching attachment A is mounted in the open space between rim portions 10 and 12 of press wheel W concentric with the axis of rotation of wheel W and thus forms a rim of press wheel W which joins beveled rims 10 and 12. In mounting attachment A it is merely required that the band 14 be laid in the space between rims 10 and 12 and the ends thereof joined by bolting together flanges 16 and 18, tightening of bolt 20 providing secure engagement of the attachment A between rings 10 and 12. Band 14 may be preformed into a general annular shape.

Figure 6:
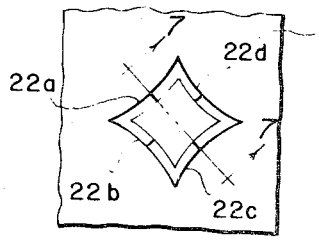
FIG. 6 is a top detail view of a mulching tooth embodiment.
Figure 7:
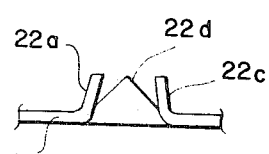
FIG. 7 is a view taken generally along line 7–7 of FIG. 6.

Attachment A includes a series of upright mulching teeth 22 which project outwardly of the outer surface of band 14. Mulching teeth 22 may, for example, be of a triangular form cut out from and bent outwardly of band 14 as indicated in FIG. 2. Mulching teeth 22 may take a variety of other forms and, as shown in FIGS. 6 and 7, may be of a crownlike configuration produced by cutting out and bending upwardly four triangular portions 22a, 22b, 22c and 22d of band 14. The resilience of band 14 may be such that the band 14 is permitted to flex inwardly to provide some flexibility. A somewhat more flexible arrangement will be described hereinbelow in connection with the embodiment of FIGS. 4 and 5.

The combination mulching attachment press wheel of the invention provides a number of advantages as compared with the press wheels of the prior art. The soil surface produced by the use of mulching attachment A is roughly in the form of a recessed "truncated" triangle in cross section with a flattened off upper surface as produced by the band attachment 14 and sloping sides as produced by the rims 10 and 12 of the press wheel W. Teeth 22 mulch the upper surface so produced and thus hardening of the soil is combated The soil surface produced by the present invention will retain water efficiently and will thus preclude drying out or crusting over of the soil.

Figure 4:
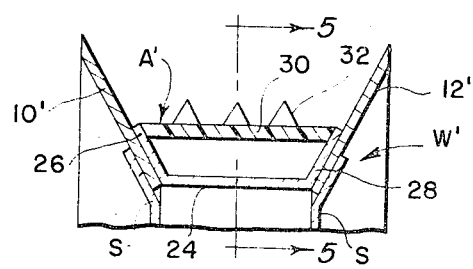
FIG. 4 is a fragmentary sectional view of a further preferred embodiment of the invention as incorporated into a press wheel.
Figure 5:
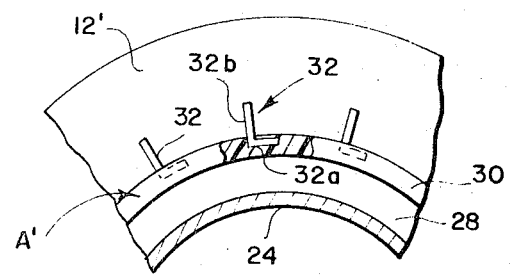
FIG. 5 is a sectional view taken generally along line 5–5 of FIG. 4.

Referring to FIGS. 4 and 5 an alternate embodiment of the invention is shown wherein an attachment A' is mounted between rim portions 10' and 12' of a press wheel W'. As described hereinbefore press wheel W' is attached to a central hub (not shown) through a series of spokes S. Press wheel W' generally corresponds to press W of FIG. 1 although the slope or bevel of rims 10' and 12' is somewhat more pronounced. The precise amount of slope of the press wheel rims 10' and 12' is, of course, a matter of design only, although it is noted that, as will be better appreciated from the following description, a more positive engagement between the press wheel W' and mulching attachment A' is effected for more marked slopes of the rim portions.

The mulching attachment A' basically comprises a supporting band 24, which is annular in form and includes first and second beveled side portions 26 and 28, and a concentric resilient "carrier" band 30 which carries or supports a plurality of mulching teeth 32. Beveled side portions 26 and 28 are adapted to engage correspondingly beveled rim portions 10' and 12' of press wheel W' when attachment A' is fitted into the open space between rim portions 10' and 12' so that a flush fit is obtained. As described hereinabove in connection with the embodiment of FIGS. 1-3 the band 26 may be provided with downwardly depending flange portions (not shown) which are bolted together to complete the mounting of attachment A' onto the press wheel W'. In addition to providing engagement with rim portions 10' and 12', beveled sides 26 and 28 of band 24 further serve to support resilient band member 30 in concentric spaced relationship to band 24. Resilient band member 30 is bonded to opposed upper portions of sides 26 and 28 as shown and may be constructed of a number of materials such as natural and synthetic rubber or a suitable plastic such as polyester, polypropylene, nylon, polyethylene, vinyl and Bakelite.

Teeth 32 are generally L-shaped in cross section and comprise a supporting base portion 32a (see FIG. 5) which is embedded into resilient band 30 and an upright portion 32b which performs the mulching function. Teeth 32 are preferably formed of metal in the embodiment shown in FIGS. 4 and 5. Alternatively teeth 32 could be molded into band 30 when band 30 is formed and thus would be constructed of whatever material band 30 is constructed.

In FIG. 8, there is shown a planting machine M which includes a series of press wheels W incorporating mulching attachments A in accordance with the present invention. A frame 34, which includes a tongue section 36 by which the machine M may be drawn and is supported by wheels 38, includes a central support bar 40. Bar 40 includes a series of pairs of outwardly extending press wheel supporting members 42 which rotatably support press wheels W therebetween. It will be appreciated that the machine M provides cultivation of the soil for planting in several rows simultaneously. It will be further understood that machine M could also include suitable seed planting devices so that both working of the soil and planting of seeds could be effected thereby.

Although the invention has been described in detail with particular reference to preferred embodiments thereof, it will be understood that variations and modifications can be effected within the scope and spirit of the invention as described hereinabove and as defined in the appended claims.

I claim:

1. A press wheel for a planter or the like comprising first and second spaced beveled rim portions for compacting the soil on both sides of a central strip of the soil formed as the press wheel passes over the soil, and mulching means mounted between said spaced rim portions of the press wheel an annular band means mounted within said rim portions concentrically with the axis of rotation of said press wheel and substantially below the outermost end periphery of said rim portions, and a plurality of closely spaced, sharply pointed mulching teeth extending radially outwardly from said band means between said rim portions and below said outermost end periphery of the rim portions for mulching said central strip of the surface of the soil as the press wheel passes thereover.

2. A press wheel as claimed in Claim 1 wherein said annular band means is constructed of metal and said mulching teeth are cut out from and bent out of said annular band means.

3. A press wheel in accordance with Claim 1 where said annular band means comprises a resilient annular member carrying a plurality of mulching teeth and said mulching attachment further comprises supporting means for supporting said resilient annulus so as to permit flexing thereof.

4. A press wheel in accordance with Claim 3 wherein said supporting means comprises an annular member including first and second beveled side portions for engaging the beveled rim portions of the press wheel.

5. A press wheel in accordance with Claim 3 wherein said mulching teeth comprise L-shaped elements embedded into said resilient member.

6. A press wheel in accordance with Claim 3 wherein said resilient member is constructed of rubber.

7. A press wheel in accordance with Claim 3 wherein said resilient member is constructed of plastic.

8. A press wheel in accordance with Claim 1 where said annular band means is formed of a bandlike member joined together at opposite ends thereof.

9. A press wheel in accordance with Claim 1 further comprising a plurality of said press wheels and means for supporting said press wheels in spaced relationship.